United States Patent Office 3,069,475
Patented Dec. 18, 1962

3,069,475
PROCESS FOR THE PRODUCTION OF DIPENTAERYTHRITOL
Henri Sidi, Paramus, N.J., assignor to Heyden Newport Chemical Corporation, New York, N.Y., a corporation of Delaware
No Drawing. Filed June 19, 1959, Ser. No. 821,347
9 Claims. (Cl. 260—615)

The present invention relates to a process for the production of polyhydric ether alcohols and particularly for the production of dipentaerythritol. More particularly it relates to a continuous process for the production of dipentaerythritol from pentaerythritol.

Pentaerythritol and its dimer dipentaerythritol are polyhydric alcohols which are widely used in the production of synthetic drying oils, alkyd resins, and other resinous materials. In general surface-coating materials prepared from dipentaerythritol are superior to those prepared from pentaerythritol in such properties as film hardness, gloss, and durability. Heretofore there has been no process known for the synthesis of dipentaerythritol, the only source of this compound being the mixture of by-products formed along with pentaerythritol by the condensation of acetaldehyde with formaldehyde under alkaline conditions. Since it has previously been produced commercially only as a by-product of the manufacture of pentaerythritol, the amount of dipentaerythritol available for use in surface-coatings and other products has been directly related to the amount of pentaerythritol produced. The limited availability of dipentaerythritol has constituted a serious handicap to the widespread use of this polyhydric alcohol in the preparation of alkyd resins and other products.

Unlike other polyhydric alcohols, such as glycerol and the glycols, pentaerythritol cannot be converted to its dimer by a simple dehydration procedure. It can, however, be dehydrated and polymerized to form polypentaerythritols of high functionality and high molecular weight. For example, Wyler in U.S. 2,468,722 disclosed that when he heated pentaerythritol in the presence of an aromatic sulfonic acid he obtained a mixture of products having the structural formula

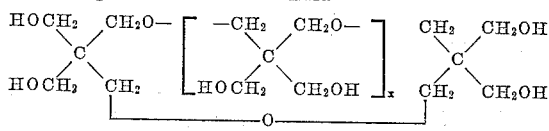

in which $x$ is a number in the range of 0 to 7. Because of their high functionality and high molecular weight such polypentaerythritol mixtures are of limited value as resin ingredients since they tend to cause premature gelation of the resins and to form films that are brittle and that have poor durability. In addition these polypentaerythritol mixtures are relatively dark in color and form resins that do not meet the color specifications which have been established for these products. For these and other reasons the mixtures of polypentaerythritols that have previously been prepared by the dehydration of pentaerythritol can in no way be considered the equivalent of dipentaerythritol and cannot be used as a replacement for dipentaerythritol in the preparation of alkyd resins, synthetic drying oils, and other products.

The present invention relates to a process by which dipentaerythritol may be produced from pentaerythritol. The dipentaerythritol resulting from this process is of excellent quality and is indistinguishable from dipentaerythritol obtained as a by-product of pentaerythritol manufacture. This dipentaerythritol is very light in color and yields light-colored products. The process of the present invention is of particular value in that it yields substantially none of the syrupy materials and higher polypentaerythritols that are also formed as by-products of pentaerythritol manufacture and that may be present in dipentaerythritol derived from this source.

It is a further advantage of the present process that any pentaerythritol which is not converted to dipentaerythritol is not contaminated or otherwise affected, but may be recovered and reused without purification. For example, it may be reused in the present process to yield additional quantities of dipentaerythritol. This feature makes it possible for the process of the present invention to be carried out in a continuous manner so as to obtain a substantially quantitative conversion of pentaerythritol to dipentaerythritol.

The synthesis of dipentaerythritol from pentaerythritol in accordance with the present invention involves the following sequence of reactions:

(A) ESTERIFICATION OF PENTAERYTHRITOL

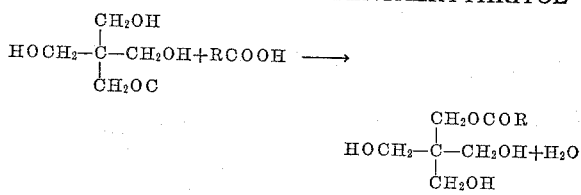

(B) DEHYDRATION (OR ETHERIFICATION)

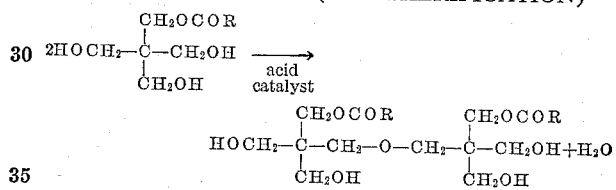

(C) INTERESTERIFICATION

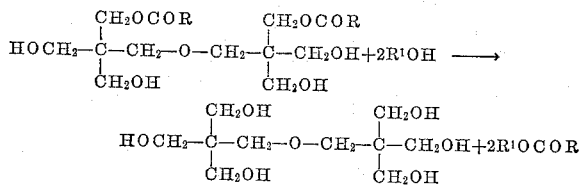

(D) ISOLATION OF DIPENTAERYTHRITOL (E) RECOVERY OF UNREACTED PENTAERYTHRITOL

In accordance with the present invention pentaerythritol is reacted with an alkanoic acid or the anhydride of such an acid to form a partial ester. Each mole of this ester contains on the average from 0.5 to 3.0 moles and preferably from 0.5 to 1.3 moles of acid radical. This partial ester is then dehydrated in the presence of a catalyst so as to etherify a portion of the partial ester of pentaerythritol, thereby forming a mixture of esters of pentaerythritol and dipentaerythritol. Interesterification of this mixture, which is effected by treatment with an alcohol, yields a mixture of pentaerythritol, dipentaerythritol, and an ester. The separation of pentaerythritol and dipentaerythritol from this mixture and the isolation of substantially pure dipentaerythritol are accomplished by known procedures. The unreacted pentaerythritol may be recovered and if desired reused in this process without purification.

The preparation of the partial ester of pentaerythritol is carried out in accordance with known procedures. For example, a mixture of pentaerythritol and an acid or anhydride may be heated at reflux temperature until esterification is complete. In this reaction from about 0.5 mole to about 3 moles and preferably about 0.5 mole to about 1.3 moles of acid or acid anhydride is present for each mole of pentaerythritol. The acids react with the pentaerythritol to form the partial ester and water as described under "A", supra. The acid anhydrides also react to partially esterify the pentaerythritol but the corresponding acid is formed as a by-product. For example, a mole of acetic acid or a mole of acetic anhydride may be used to obtain substantially the same results, that is, a partial ester containing a mole of acid radical ($CH_3COO$) per mole of ester. The acids that may be used in this esterification are the straight or branched chain alkanoic acids which contain from 1 to 18 carbon atoms of their anhydrides, the preferred acids being those which contain from 1 to 4 carbon atoms and the anhydrides of these acids. Illustrative acids include caproic acid, 2-ethylhexanoic acid, pelargonic acid, lauric acid, palmitic acid and stearic acid, with the preferred acids and anhydrides being formic acid, acetic acid, acetic anhydride, propionic acid, propionic anhydride, butyric acid, isobutyric acid, and butyric anhydride. A single acid or a mixture of two or more of these acids may be used. It is to be understood that the term "acid" as used herein includes both alkanoic acids and the anhydrides of these acids.

The esterification of pentaerythritol may be carried out in the absence of a catalyst or in the presence of an esterification catalyst, such as phosphoric acid or an organic sulfonic acid. The temperature at which the esterification takes place and the duration of the esterification period are largely dependent upon the choice of acid, with the esterification generally carried out at the reflux temperature of the reaction mixture.

Dehydration (or etherification) of the partial ester of pentaerythritol is accomplished by heating the ester in the presence of an acid dehydration catalyst until the desired amount of water of etherification has been removed from the ester. Among the catalysts that may be used in this dehydration step are alkane sulfonic acids, aromatic sulfonic acids such as xylene sulfonic acid and p-toluene sulfonic acid, and phosphoric acid. A cation exchange resin, for example, a nuclear sulfonated polystyrene resin in its hydrogen cycle, has been found to yield an exceptionally light-colored product. The dehydration catalyst is usually present in an amount ranging from about 0.1% to about 0.4% based on the weight of pentaerythritol originally charged. When less than about 0.1% of catalyst is used, the reaction takes place too slowly to be of commercial interest. When shortened dehydration periods are desired or when a cation exchange resin is used to catalyze the reaction, 1–3%, or more, of catalyst may be used without affecting the course of the reaction or the quality of the product.

The partial ester of pentaerythritol is dehydrated by heating it in the presence of an acid catalyst at 150° to 210° C. at 10 mm. to 150 mm. and preferably at 160° to 190° C. at 20 mm. to 40 mm. until the desired amount of water if etherification has been evolved. Under the preferred conditions, optimum yields of light-colored dipentaerythritol and substantially quantitative recoveries of unreacted pentaerythritol are obtained. The dehydration may if desired be carried out at atmospheric pressure and at temperatures as high as 275° C., but under these conditions higher polypentaerythritols are formed and some decomposition may take place, thus adversely affecting the yield and the quality of the product. In addition, when the dehydration is carried out at atmospheric pressure and at elevated temperatures, the recovered pentaerythritol is generally contaminated and requires purification before it can be reused.

The yield of dipentaerythritol and the quality of the product are dependent to a large extent upon the amount of water of etherification evolved during the dehydration step. The removal of at least 0.1 mole of water of etherification per mol of pentaerythritol is necessary in order to obtain a satisfactory conversion of pentaerythritol to dipentaerythritol. When more than about 0.4 mole of water of etherification per mole of pentaerythritol is evolved, higher polymers of pentaerythritol are formed and some decomposition and discoloration of the product may occur. When this is the case, it is difficult if not impossible to recover substantially pure dipentaerythritol in good yield. I prefer to continue the dehydration step until about 0.2 mole to about 0.35 mole of water of etherification per mole of pentaerythritol has been evolved. Once the period of time required for the dehydration step has been determined for a given set of conditions in the reaction including temperature, pressure, and the amount of water of etherification evolved, then other batches may be dehydrated for the predetermined period and the reaction discontinued without waiting for the calculation of the amount of water of etherification to be completed.

The mixture of esters of pentaerythritol and dipentaerythritol that results from the dehydration step is heated with a monohydric alcohol in the presence of a catalyst to effect interesterification, that is, to bring about the transfer of ester radicals from the polyhydric alcohols to the monohydric alcohol. The product resulting from the interesterification step thus contains pentaerythritol, dipentaerythritol, and an ester of the monohydric alcohol. It may also contain unreacted monohydric alcohol. The polyhydric alcohols may be readily separated from this mixture, for example, by distillation to remove the ester and any unreacted monohydric alcohol or by cooling to precipitate the polyhydric alcohols and subsequent filtration.

The monohydric alcohol used in the interesterification step is a straight-chain or branched-chain alkanol which contains from 1 to 18 carbon atoms and preferably from 1 to 5 carbon atoms. Illustrative of the alkanols are the following: methanol, ethanol, propanol, isopropanol, n-butanol, 1-pentanol, 2-pentanol, and 2-methyl-2-butanol. Other alkanols which may be used are octanol, lauryl alcohol, cetyl alcohol, pentadecanol, and octadecanol. When a distillation technique is to be used to separate the alkanol ester from the polyhydric alcohols, the choice of alkanol to be used in the interesterification step is to some degree dependent upon the acid used in the initial step of the process. Since it is preferred that the distillation of the ester and any excess alkanol be carried out at a temperature below about 150° C. to avoid further dehydration and possible discoloration of the product, the alkanol must be one that will form with the acid an ester which has a boiling point below about 150° C. at atmospheric pressure or subatmospheric pressure. When acids containing more than about 6 carbon atoms or alkanols containing more than about 5 carbon atoms are used, the distillation is generally carried out under reduced pressure. In most cases methanol and ethanol are the preferred alkanols in the interesterification step.

To facilitate the separation of the polyhydric alcohols, the amount of alkanol used in this step is usually in excess of that required to react with the acid radicals present in the reaction mixture. Any of the well-known interesterification catalysts may be used in this step of the process. These include, for example, calcium oxide, sodium methoxide, and hydrochloric acid. Hydrochloric acid is the preferred catalyst because it can be readily separated from the products of the interesterification. The mixture of alkanol and ester resulting from the interesterification step may if desired be separated by fractional distillation, or the alkanol may be recovered by treating the mixture with sodium hydroxide to saponify the ester and distilling the resulting mixture to recover the alkanol.

The mixture of pentaerythritol and dipentaerythritol which results from the interesterification step usually contains from about 20% to about 80% of dipentaerythritol. When each of the process steps is carried out under the preferred conditions, the mixture contains about 25% to about 50% of dipentaerythritol. When the process is carried out so as to yield a product containing substantially more than 50% of dipentaerythritol, the product is usually discolored and may be contaminated with small amounts of by-products resulting from the pyrolysis of the polyhydric alcohols.

Dipentaerythritol may be isolated from the product resulting from the interesterification by any convenient procedure. For example, sufficient water may be added to dissolve the product and the dipentaerythritol subsequently precipitated from the solution. I prefer to use a technique in which the product is treated with an amount of water which will dissolve substantially all of the pentaerythritol but which will dissolve only a small portion of the dipentaerythritol. The undissolved dipentaerythritol may then be separated from the aqueous pentaerythritol solution by filtration or by decantation. Unreacted pentaerythritol may be recovered by evaporating the aqueous solution to dryness.

In another embodiment of the invention, the mixture of esters of pentaerythritol and dipentaerythritol resulting from the dehydration step is subjected to fractional distillation under reduced pressure to separate the pentaerythritol ester from the dipentaerythritol ester. The dipentaerythritol ester fraction may then be treated with an alkanol in the presence of a catalyst to yield substantially pure dipentaerythritol. The pentaerythritol ester fraction may be recycled to the dehydration step of the process.

Dipentaerythritol prepared in accordance with the present invention meets all of the commercial specifications that have been established for dipentaerythritol. Its infrared spectrum is identical to that of dipentaerythritol obtained as a by-product of pentaerythritol manufacture. Alkyd resins and other products prepared from dipentaerythritol produced by the present novel process are equivalent in every way to the corresponding products prepared from dipentaerythritol obtained as a by-product of pentaerythritol manufacture.

The following examples will illustrate the manner in which the present invention may be practiced. It is to be understood, however, that these examples are not to be construed as being limitative but are furnished merely for purposes of illustration.

*Example 1*

A mixture of 272 grams (2.0 moles) of pentaerythritol, 132.6 grams (1.3 moles) of acetic anhydride, and 0.54 gram (0.0049 mole) of a mixture of alkane sulfonic acids containing a major amount of ethane sulfonic acid was placed in a flask equipped with a thermometer, stirrer, reflux condenser, and heating mantle. The mixture was heated with stirring at reflux temperatures (approximately 140° C.) for 2 hours and then cooled to 100° C. The reflux condenser was replaced by a distillation condenser. The reaction mixture was heated to 175°–180° C. at 25–30 mm. absolute pressure in an hour and held at this temperature for 2 hours during which time a distillate of water and acetic acid was collected. Analysis of the distillate indicated that it contained about 0.65 mole of water of esterification and about 0.4 mole of water of etherification. The reaction mixture was cooled with stirring to 85° C. and, after the distillation condenser had been replaced by a reflux condenser, 316 grams (9.9 moles) of methanol and 14.2 grams (0.14 mole) of 36.5% hydrochloric acid were added to it. The reaction mixture was heated at reflux temperature for 4 hours after which methanol and methyl acetate were removed by distillation. The heating was continued until the vapor temperature reached 63° C. Then 500 grams of water was added, and the distillation was continued until the vapor temperature reached 100° C. The residue was slowly cooled to room temperature with stirring and then filtered. The residual pentaerythritol-dipentaerythritol mixture after drying weighed 235 grams and contained about 33.5% of dipentaerythritol. This mixture was heated with 1070 grams of distilled water to 47° C. and held at this temperature for an hour. The resulting slurry was filtered, and the filter cake was washed with two 50 ml. portions of distilled water at 47°–59° C. and dried. There was obtained 76.2 grams of dipentaerythritol which had the following characteristics:

| | |
|---|---|
| Appearance | White powder. |
| Odor | None. |
| Percent inorganic compounds | 0.032. |
| Hydroxyl content | 38.22%. |
| Melting range | 207.5°–213° C. |
| APHA color | 13 cloudy. |

This material had an infrared spectrum that was identical to that of dipentaerythritol obtained as a by-product of pentaerythritol manufacture.

The filtrates resulting from the isolation of the pentaerythritol-dipentaerythritol mixture and from the separation of the dipentaerythritol components of that mixture were combined and evaporated to dryness under reduced pressure. There was obtained in this way 185 grams of pentaerythritol. This recovered material was used in the preparation of an additional quantity of dipentaerythritol as is shown in Example 2.

*Example 2*

A mixture of 161.4 grams (1.18 moles) of the pentaerythritol recovered in Example 1, 78.6 grams (0.77 mole) of acetic anhydride, and 0.27 gram of mixed alkane sulfonic acids was heated at reflux temperature for 2 hours. At the end of this time the reaction mixture was cooled to 100° C. and then dehydrated by heating it at 175°–180° C. at 27–30 mm. absolute pressure for an hour. After cooling to 85° C., the reaction mixture was mixed with 250 ml. of methanol and 8 ml. of 36.5% hydrochloric acid and heated at reflux temperature for 4 hours. The methanol and methyl acetate were separated as described in Example 1 to yield a residue which weighed 140.3 grams and which contained 32.3% of dipentaerythritol. The dipentaerythritol, which was isolated by the technique described in Example 1, was equivalent in quality to the product of Example 1. Its infrared spectrum was identical to that of the product of Example 1.

The pentaerythritol recovered from the filtrates may be used in a third run to form an additional amount of dipentaerythritol.

*Example 3*

The procedure described in Example 1 was repeated except that in the dehydration step the reaction mixture was heated to 175°–180° C. at 25–30 mm. absolute pressure in an hour and held at that temperature for 2.5 hours. After interesterification and removal of methanol and methyl acetate by distillation, a pentaerythritol-dipentaerythritol mixture was obtained which weighed 245 grams and which contained 48% of dipentaerythritol. The dipentaerythritol, which was isolated by the previously described technique, was equivalent in quality to the product of Example 1. Its infrared spectrum was identical to that of dipentaerythritol obtained as a by-product of pentaerythritol manufacture.

The pentaerythritol which was recovered was used to prepare an additional amount of dipentaerythritol as is shown in Example 4.

*Example 4*

The 272 grams of pentaerythritol which was used in this run was made up of 180 grams of pentaerythritol recovered from the process of Example 3 and 92 grams of fresh pentaerythritol. The process, which was carried out as indicated in Example 1, yielded 230 grams of a product which contained about 35% of dipentaerythritol. The pentaerythritol which was recovered from this run may be combined with fresh pentaerythritol and reused in the preparation of an additional amount of dipentaerythritol.

Example 5

A mixture of 283.4 grams (2.0 moles) of pentaerythritol, 120.0 grams (2.0 moles) of acetic acid, 56.6 grams (3.14 moles) of water, and 0.4 gram of mixed alkane sulfonic acids was heated at 112°–114° C. for 10 hours. The reaction mixture was then dehydrated by heating it at 169°–180° C. at 28–30 mm. absolute pressure for 4 hours. The resulting mixture of esters was heated with 400 ml. of methanol and 25 ml. of 21% hydrochloric acid until interesterification was complete and then cooled. The precipitated solids were separated by filtration and dried to give a cake which weighed 251.6 grams and which contained about 43% of dipentaerythritol. The dipentaerythritol was isolated by the technique described in Example 1.

Example 6

A mixture of 136.0 grams (1.0 mole) of pentaerythritol, 51.0 grams (1.0 mole) of 90% formic acid, and 0.2 gram of mixed alkane sulfonic acids was heated at 116°–118° C. for 2 hours. The reaction mixture was then dehydrated by heating it at 165°–170° C. at 29–37 mm. absolute pressure for 30 minutes. The resulting mixture of esters was heated with 200 ml. of methanol and 15 ml. of 21% hydrochloric acid until interesterification was complete and then cooled. The product, which was isolated by filtration and drying, weighed 119 grams and contained 35.4% of dipentaerythritol. The dipentaerythritol was isolated by the technique described in Example 1.

Example 7

A mixture of 272 grams (2.0 moles) of pentaerythritol, 102 grams (1.0 mole) of acetic anhydride, and 0.4 gram of p-toluenesulfonic acid was heated at 150° C. for 3 hours. The reaction mixture was then dehydrated by heating it at 160°–163° C. at 20 mm. absolute pressure until the distillate contained 0.7 mole of water of etherification. The dehydrated reaction mixture was then cooled at 80° C., and 1000 ml. of ethanol and 50 ml. of 21% hydrochloric acid were added to it. This mixture was heated until about 500 ml. of ethanol and ethyl acetate had been removed from it by distillation. The residue was cooled to room temperature. The resulting precipitate was collected, washed with ethanol, and dried. It contained about 25% of dipentaterythritol, which was isolated by the technique described in Example 1.

Example 8

The mixture of 136 grams (1.0 mole) of pentaerylthritol and 102 grams (1.0 mole) of acetic anhydride was heated at reflux temperature for 8 hours. At the end of this period 0.2 gram of mixed alkane sulfonic acids was added to the reaction mixture which was then dehydrated by heating at 165°–170° C. at 25 mm. absolute pressure until 0.2 mole of water of etherification had been evolved. Then 500 ml. of ethanol and 25 ml. of 21% hydrochloric acid were added, and the mixture was heated to distill off approximately 250 ml. of ethanol and ethyl acetate. The residue was cooled to 25° C. with stirring. The resulting precipitate was collected, washed with ethanol, and dried. It was shown by analysis to contain about 25% of dipentaerythritol.

The process of the present invention is not to be construed as being limited to the production of dipentaerythritol from pentaerythritol. It may also be used for the production of various other polyhydric ether alcohols, particularly those which are dimers of such neopentyl polyhydric alcohols as trimethylolethane and trimethylolpropane. The formation of the polyhydric ether alcohol in each case takes place as indicated by the following equation:

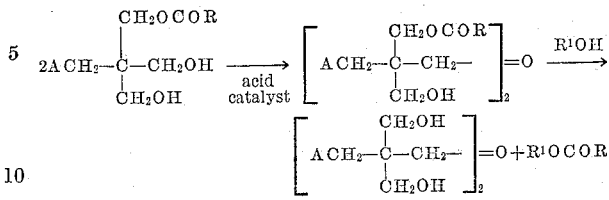

In this equation A represents either a hydroxyalkyl group, a hydrogen atom, or a lower alkyl radical.

In each case the partial ester which is dehydrated is the product of the esterification of a neopentyl polyhydric alcohol with an amount of a lower alkanoic acid which will esterify an average of from about 0.5 hydroxyl group to about one less than the total number of hydroxyl groups in the alcohol. Thus when a trihydric alcohol is the starting material, an average of from about 0.5 to about 2 hydroxyl groups are esterified. The remainder of the process is similar to that previously described for the production of dipenterylthritol: The partial ester is dehydrated in the presence of an acid dehydration catalyst at a temperature between about 150° and 210° C. at an absolute pressure of 10 to 150 mm. until about 0.1 to about 0.4 mole of water of etherification has been evolved for each mole of partial ester; the resulting mixture of esters is heated with a monohydric alcohol and catalyst to effect interesterification; the polyhydric alcohols are separated from the product of the interesterification; and the polyhydric ether alcohol is isolated.

Like dipentaerythritol, ditrimethylolethane and other neopentyl polyhydric ether alcohols resulting from this process are useful in the preparation of synthetic drying oils and various surface-coating compositions.

I claim:

1. The process which comprises the steps of forming a partial ester of a polyhydric alcohol selected from the group consisting of neopentyl trihydric alcohols, neopentyl tetrahydric alcohols, and mixtures thereof by heating said polyhydric alcohol with an acid selected from the group consisting of alkanoic acids containing from 1 to 18 carbon atoms and anhydrides of said acids in the amount of from about 0.5 mole of acid to about 2 moles of acid per mole of polyhydric alcohol, heating said partial ester in the presence of an acid dehydration catalyst until about 0.1 to about 0.35 mole of water of etherification has been evolved for each mole of said partial ester, thereby forming a mixture consisting essentially of esters of said polyhydric alcohol and the dimer of said polyhydric alcohol, heating said mixture of esters with a monohydric alcohol and an interesterification catalyst to form a mixture consisting essentially of said polyhydric alcohol, the dimer of said polyhydric alcohol, and an ester of said monohydric alcohol, separating the polyhydric alcohols from said mixture, and thereafter isolating said dimer.

2. A process for the production of dipentaerythritol which comprises the steps of forming a partial ester of pentaerythritol by heating pentaerythritol with an acid selected from the group consisting of alkanoic acids containing from 1 to 18 carbon atoms and the anhydrides of said acids in the amount of from 0.5 mole to about 3 moles of said acid per mole of pentaerythritol, heating said partial ester of pentaetrythritol in the presence of an acid dehydration catalyst until about 0.1 mole to about 0.35 mole of water of etherification has been evolved for each mole of said partial ester, thereby forming a mixture consisting essentially of esters of pentaerythritol and dipentaerythritol, heating said mixture of esters with a monohydric alcohol and an interesterification catalyst to form a mixture containing pentaerythritol, dipentaerythritol, and an ester of said polyhydric alcohol, and thereafter recovering dipentaerythritol from said mixture.

3. A process for the production of dipentaerythritol which comprises the steps of forming a partial ester of pentaerythritol by heating pentaerythritol with an acid selected from the group consisting of alkanoic acids containing from 1 to 4 carbon atoms and anhydrides of said acids in the amount of from about 0.5 mole to about 3 moles of said acid per mole of pentaerythritol, heating said partial ester of pentaerythritol in the presence of an acid dehydration catalyst at a temperature between about 150° and 210° C. at an absolute pressure of 10 to 150 mm. until about 0.1 to about 0.35 mole of water of etherification has been evolved for each mole of said partial ester, thereby forming a mixture consisting essentially of esters of pentaerythritol and dipentaerythritol, heating said mixture of esters with a lower alkanol and an interesterification catalyst to form a mixture containing pentaerythritol, dipentaerylthritol, and an ester of said alkanol, and thereafter separating pentaerythritol and dipentaerythritol from said mixture.

4. A process for the production of dipentaerythritol which comprises the steps of forming a partial ester of pentaerythritol by heating pentaerythritol with an acid selected from the group consisting of alkanoic acids containing from 1 to 4 carbon atoms and anhydrides of said acids in the amount of from about 0.5 to about 1.3 moles of said acid per mole of pentaerythritol, heating said partial ester of pentaerythritol in the presence of an acid dehydration catalyst at a temperature between about 160° and 190° C. at an absolute pressure of 20 to 40 mm. until about 0.2 to about 0.35 mole of water of etherification has been evolved for each mole of said partial ester, thereby forming a mixture consisting essentially of esters of pentaerythritol and dipentaerythritol, heating said mixture of esters in the presence of an interesterification catalyst with an amount of a lower alkanol in excess of that required for interesterification to form a mixture comprising pentaerythritol, dipentaerythritol, alkanol, and an ester of said alkanol, separating pentaerythritol and dipentaerythritol from said mixture, and thereafter isolating the dipentaerythritol.

5. A process for the production of dipentaerythritol which comprises the steps of forming a pentaerythritol acetate by heating pentaerythritol with acetic anhydride in the amount of about 0.5 to about 1.3 moles of acetic anhydride per mole of pentaerythritol, heating said pentaerythritol acetate in the presence of an acid dehydration catalyst at a temperature between about 160° and 190° C. at an absolute pressure of 20 to 40 mm. until about 0.2 to about 0.35 mole of water of etherification has been evolved for each mole of acetate, thereby forming a mixture consisting essentially of pentaerythritol acetate and dipentaerythritol acetate, heating said mixture of acetates in the presence of an interesterification catalyst with an amount of a lower alkanol in excess of that required for interesterification to form a mixture comprising pentaerythritol, dipentaerythritol, alkanol, and alkanol acetate, separating pentaerythritol and dipentaerythritol from said mixture, and thereafter isolating the dipentaerythritol.

6. A process for the production of dipentaerythritol which comprises the steps of forming a pentaerythritol acetate by heating pentaerythritol with acetic anhydride in the amount of about 0.5 mole to about 1.3 moles of acetic anhydride per mole of pentaerythritol, heating said pentaerythritol acetate in the presence of mixed alkane sulfonic acids at a temperature between about 160° and 190° C. at an absolute pressure of 20 to 40 mm. until about 0.2 mole to about 0.35 mole of water of etherification has been evolved for each mole of said pentaerythritol ester, thereby forming a mixture consisting essentially of pentaerythritol acetate and dipentaerythritol acetate, heating said mixture of acetates with methanol and hydrochloric acid, the amount of methanol being in excess of that required to react with all of the acetate groups in said mixture of acetates, to form a mixture containing pentaerythritol, dipentaerythritol, methanol, and methyl acetate distilling methanol and methyl acetate from said mixture to yield a residue consisting essentially of pentaerythritol and dipentaerythritol, treating said residue at a temperature in the range of 45° to 55° C. with water in an amount which will dissolve substantially all of the pentaerythritol and which will dissolve only a small portion of the dipentaerythritol, and thereafter separating the resulting aqueous pentaerythritol solution from the undissolved dipentaerythritol by filtration.

7. A continuous process for the production of dipentaerythritol which comprises the steps of forming a partial ester of pentaerythritol by heating pentaterythritol with an acid selected from the group consisting of alkanoic acids containing from 1 to 18 carbon atoms and the anhydrides of said acids in the amount of from 0.5 mole to about 3 moles of said acid per mole of pentaerythritol, heating said partial ester in the presence of an acid dehydration catalyst until about 0.2 mole to about 0.35 mole of water of etherification has been evolved for each mole of said partial ester, thereby forming a mixture consisting essentially of esters of pentaerythritol and dipentaerythritol, heating said mixture of esters with a monohydric alcohol and an interesterification catalyst to form a mixture comprising pentaerythritol, dipentaerythritol, and an ester of said monohydric alcohol, separating from said mixture a mixture of pentaerythritol and dipentaerythritol, treating said mixture of pentaerythritol and dipentaerythritol with water to form an aqueous pentaerythritol solution and an undissolved dipentaerythritol fraction, separating said undissolved dipentaerythritol fraction from said equeous pentaerythritol solution, evaporating said aqueous solution to yield a residue of recovered pentaerythritol, and thereafter using said recovered pentaerythritol in the aforementioned esterification, dehydration, interesterification, and isolation steps to obtain an additional amount of dipentaerythritol.

8. A continuous process for the production of dipentaerythritol which comprises the steps of forming a partial ester of pentaerythritol by heating pentaerythritol with an acid selected from the group consisting of alkanoic acids containing from 1 to 4 carbon atoms and anhydrides of said acids in the amount of from about 0.5 to about 3 moles of said acid per mole of pentaerythritol, heating said partial ester of pentaerythritol in the presence of an acid dehydration catalyst at a temperature between about 150° and 210° C. at an absolute pressure of 10 to 150 mm. until about 0.1 to about 0.35 mole of water of etherification has been evolved for each mole of said partial ester thereby forming a mixture consisting essentially of esters of pentaerythritol and dipentaerythritol, heating said mixture of esters with a lower alkanol and an interesterification catalyst to form a mixture comprising pentaerythritol, dipentaerythritol, and an ester of said alkanol, separating from said mixture a mixture of pentaerythritol and dipentaerythritol, treating said mixture of pentaerythritol and dipentaerythritol at a temperature in the range of 45° to 55° C. with water in an amount which will dissolve substantially all of the pentaerythritol and which will dissolve only a small portion of the dipentaerythritol, separating the undissolved dipentaerythritol from the aqueous pentaerythritol solution by filtration, evaporating said aqueous pentaerythritol solution to dryness to obtain a residue of recovered pentaerythritol, adding to said recovered pentaerythritol an additional amount of pentaerythritol, and repeating the aforementioned esterification, dehydration, interesterification, and isolation steps to obtain an additional amount of dipentaerythritol.

9. A continuous process for the production of dipentaerythritol which comprises the steps of forming pentaerythritol acetate by heating pentaerythritol with acetic anhydride in the amount of about 0.5 mole to about 1.3 moles of acetic anhydride per mole of pentaerythritol, heating said pentaerythritol acetate in the presence of mixed alkane sulfonic acids at a temperature between 160° and 190° C. at an absolute pressure of 20 to 40 mm. until about 0.2 to about 0.35 mole of water of etherification has been evolved for each mole of acetate thereby forming a mixture consisting essentially of pentaerythritol acetate and dipentaerythritol acetate, heating said mixture of acetates with methanol and hydrochloric acid, the amount of methanol being in excess of that required to react with all of the acetate groups in said mixture of acetates, to form a mixture comprising pentaerythritol, dipentaerythritol, methanol, and methyl acetate, distilling methanol and methyl acetate from said mixture to yield a residue comprising pentaerythritol and dipentaerythritol, treating said residue at a temperature in the range of 45° to 55° C. with water in an amount which will dissolve substantially all of the pentaerythritol and which will dissolve only a small portion of the dipentaerythritol, separating the undissolved dipentaerythritol from the aqueous pentaerythritol soltuion by filtration, evaporating said aqueous pentaerythritol solution to dryness under subatmospheric pressure to obtain a residue of recovered pentaerythritol, adding to said recovered pentaerythritol an additional amount of pentaerythritol, and repeating the aforementioned esterification, dehydration, interesterification, and isolation steps to obtain an additional amount of dipentaerythritol.

References Cited in the file of this patent
UNITED STATES PATENTS

| | | |
|---|---|---|
| 2,182,397 | Eckey | Dec. 5, 1939 |
| 2,809,206 | Wilson et al. | Oct. 8, 1957 |
| 2,945,830 | Kraft | July 19, 1960 |